(12) United States Patent
Goff

(10) Patent No.: US 6,836,825 B2
(45) Date of Patent: Dec. 28, 2004

(54) METHOD AND APPARATUS FOR SYNCHRONIZING CACHES IN A DISTRIBUTED COMPUTING SYSTEM

(75) Inventor: Max K. Goff, Reno, NV (US)

(73) Assignee: Sun Microsystems, Inc., Santa Clara, CA (US)

( * ) Notice: Subject to any disclaimer, the term of this patent is extended or adjusted under 35 U.S.C. 154(b) by 304 days.

(21) Appl. No.: 10/189,055

(22) Filed: Jul. 1, 2002

(65) Prior Publication Data

US 2004/0003177 A1 Jan. 1, 2004

(51) Int. Cl.[7] .............................................. G06F 12/00
(52) U.S. Cl. ........................ 711/118; 711/122; 711/133; 711/134; 711/141; 711/159; 711/160
(58) Field of Search ................. 711/118, 122, 711/133, 136, 141, 159, 160

(56) References Cited

U.S. PATENT DOCUMENTS 5,933,840 A * 8/1999 Menon et al. ............... 707/206
6,178,481 B1 * 1/2001 Krueger et al. .............. 711/122
6,321,092 B1 * 11/2001 Fitch et al. ................. 455/456.5
2002/0062336 A1 * 5/2002 Teodosiu et al. ............ 709/201
2003/0110242 A1 * 6/2003 Brown et al. ............... 709/222

OTHER PUBLICATIONS

Teodosiu et al US 2002/0062375 dis closes tracking service for peer to peer resources.*
Kruger Steven, 60/029232 discloses microprocessor circuit with life spanned circuitry.*
Ferguson Earl, 60/008799 discloses method and apparatus for ATM switch.*

* cited by examiner

Primary Examiner—Donald Sparks
Assistant Examiner—Ngoc V Dinh
(74) Attorney, Agent, or Firm—Park, Vaughan & Fleming, LLP

(57) ABSTRACT

One embodiment of the present invention provides a system for synchronizing a cache in a computer system through a peer-to-peer refreshing operation. During operation, the system determines the age of an entry in the cache. If the age of the entry exceeds a life span for the entry, the system invalidates the entry in the cache. The system subsequently refreshes the entry by retrieving an updated version of the entry from a peer of the computer system, if possible, instead of from a centralized source for the entry.

24 Claims, 3 Drawing Sheets

METHOD AND APPARATUS FOR SYNCHRONIZING CACHES IN A DISTRIBUTED COMPUTING SYSTEM

BACKGROUND

1. Field of the Invention

The present invention relates to distributed computing systems. More specifically, the present invention relates to a method and an apparatus for synchronizing caches in a distributed computing system using a peer-to-peer refreshing mechanism.

2. Related Art

As computer networks continue to proliferate, it is becoming progressively easier for geographically distributed computer systems to work together in performing computational tasks. Historically, such cooperation has been restricted by significant delays and bandwidth limitations involved in communicating between geographically distributed computer systems—which may possibly be separated by thousands of miles.

However, as the networking infrastructure continues to improve, these delays and bandwidth limitations have been dramatically reduced. This makes it possible for a distributed application to effectively operate on a set of geographically distributed computing nodes in the same way as a distributed application operates on a set of local computing nodes in a local cluster.

However, synchronizing activities between geographically distributed computing nodes can be very challenging. In particular, resolving cache coherence issues between geographically distributed computing nodes can be problematic. Cache coherence issues arise whenever multiple caches can potentially contain the same data item. If a copy of the data item is updated in one cache, other copies of the data item in other caches become stale and must somehow be invalidated (or updated). Existing techniques for performing invalidation (or updating) operations are unacceptably slow in distributed computing systems that span a set of geographically distributed computing nodes.

What is needed is a method and an apparatus that facilitates cache coherence between caches that are distributed across a set of geographically distributed computing nodes.

SUMMARY

One embodiment of the present invention provides a system for synchronizing a cache in a computer system through a peer-to-peer refreshing operation. During operation, the system determines the age of an entry in the cache. If the age of the entry exceeds a life span for the entry, the system invalidates the entry in the cache. The system subsequently refreshes the entry by retrieving an updated version of the entry from a peer of the computer system, if possible, instead of from a centralized source for the entry.

In a variation on this embodiment, determining the age of the entry involves determining the age of the entry with reference to a time value extracted from a Global Positioning System (GPS) signal.

In a variation on this embodiment, the system determines the life span for the entry based upon a taxonomy of data that associates different life spans with different types of data.

In a variation on this embodiment, refreshing the entry involves waiting until the entry is accessed again before retrieving the updated version of the entry.

In a variation on this embodiment, refreshing the entry involves automatically refreshing the entry without waiting until the entry is accessed again.

In a variation on this embodiment, refreshing the entry involves attempting to retrieve the updated version of the entry from a first-order peer, which is part of the same peer group as the computer system. If the updated version of the entry cannot be retrieved from a first-order peer, the system attempts to retrieve the updated version of the entry from a second-order peer, which is accessible through a first order peer.

In a variation on this embodiment, if the updated version of the entry cannot be retrieved from a peer of the computer system, the system retrieves the updated version of entry from the centralized source for the entry.

In a variation on this embodiment, if a given peer of the computer system subsequently requests the updated version of the entry, the system supplies the updated version of the entry to the given peer.

In a variation on this embodiment, retrieving the updated version of the entry involves using a Juxtapose (JXTA) framework to facilitate peer-to-peer communications to retrieve the entry.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Distributed Computing System

Figure 1:
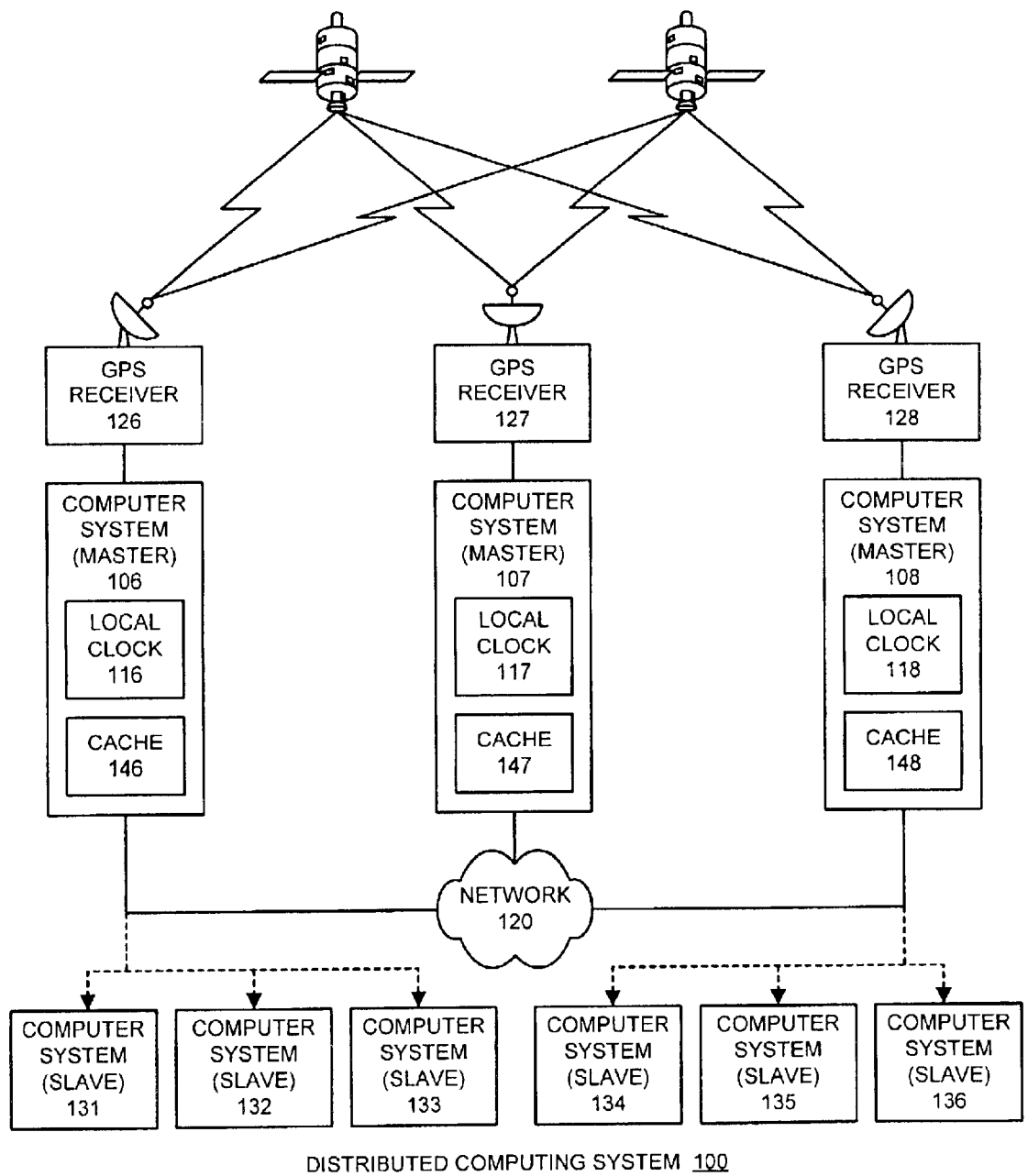
FIG. 1 illustrates a distributed computing system in accordance with an embodiment of the present invention.

FIG. 1 illustrates a distributed computing system 100 in accordance with an embodiment of the present invention. Distributed computing system 100 includes a number of master computer systems 106–108, which are coupled to network 120. Master computer systems 106–108 can include geographically distributed computing nodes, or alternatively, can include nodes that are part of the same local network or cluster. Network 120 can generally include any type of wire or wireless communication channel capable of coupling together computer systems. This includes, but is not limited to, a local area network, a wide area network, or a combination of networks. In one embodiment of the present invention, network 120 includes the Internet.

Note that master computer system 106 communicates with slave computer systems 131–133, and master computer system 108 communicates with slave computer systems 134–136. This communication can take place through separate local area networks, or alternatively, through network 120.

Master computer systems 104–106 and slave computer systems 131–136 can generally include any type of computer system, including, but not limited to, a computer system based on a microprocessor, a mainframe computer, a digital signal processor, a device controller, and a computational engine within an appliance.

Moreover, master computer systems 106–108 include caches 146–148, respectively. Coherence is maintained between caches 146–148 by performing invalidation operations through a process that is described below with reference to FIG. 3. Note that slave computer systems 131–13 can also include caches (not shown) that can participate in the cache coherence operations.

Master computer systems 106–108 are coupled to Global Positioning System (GPS) receivers 126–128, respectively. GPS receivers 126–128 communicate with one or more GPS satellites 101–102 to obtain time base information. Note that signals from two different GPS satellites are required to determine a geographical location. However, once a geographical location of a receiver is known, only signals from one GPS satellite are needed to determine time base information.

Master computer systems 104–106 use time base information obtained through GPS receivers 126–128 to periodically synchronize local clocks 116–118 within master computer systems 106–108, respectively. Master computer system 106 can then communicate with slave computer systems 131–133 to synchronize local clocks on slave computer systems 131–133 (not shown). Master computer system 108 can similarly communicate with slave computer systems 134–136 to synchronize local clocks on slave computer systems 134–136 (not shown). This synchronization process is described in more detail below with reference to FIG. 2.

Process of Synchronizing Local Clock Signals

Figure 2:
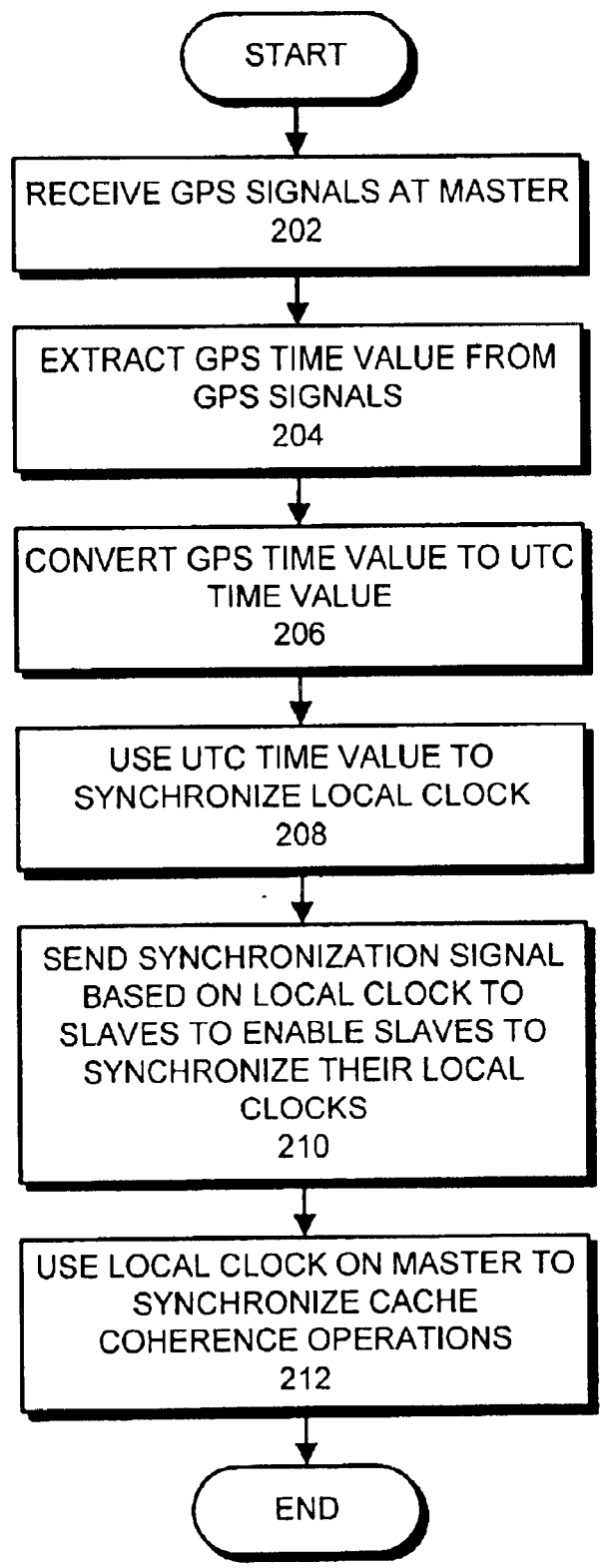
FIG. 2 is a flow chart illustrating the process of using GPS signals to synchronize multiple computer systems on a stationary network in accordance with an embodiment of the present invention.

FIG. 2 is a flow chart illustrating the process of using GPS signals to synchronize multiple computing systems on a stationary network in accordance with an embodiment of the present invention.

The system starts by receiving GPS signals at master computer systems 104–106 (step 202). In order to obtain more accuracy, this may involve additionally receiving differential GPS (DGPS) signals, Wide Area Augmentation System (WAAS) signals, or Local Area Augmentation System (LAAS) signals. DGPS signals and LAAS signals are additional signals that are received from a ground station to provide additional accuracy, while the WAAS signals are additional signals that are received from geosynchronous satellites to provide additional accuracy.

Next, the system extracts a GPS time value from the GPS signals at master computer systems 104–106 (step 204). Note that extracting the time value from the GPS signals can involve using Precise Positioning Service (PPS) signals within the GPS signals to obtain a time value that is accurate to within 200 nanoseconds. Alternatively, it can involve using Standard Positioning Service (SPS) signals within the GPS signals to obtain a time value that is accurate to within 340 nanoseconds.

Note that PPS signals have historically only been available to authorized users with cryptographic equipment and keys and specially equipped receivers, such as U.S. and Allied military, certain U.S. Government agencies, and selected civil users specifically approved by the U.S. Government. Other users had to use the Standard Positioning Service, which is somewhat less accurate in specifying geographical locations and times.

Next, the system optionally converts the GPS time values into corresponding Universal Coordinated Time (UTC) time values by using UTC correction parameters contained in the GPS signals (step 206). Note that GPS time does not take into account leap seconds and is consequently drifting ahead of UTC time.

The system then uses the UTC time values to synchronize (reset) the local clocks 116–118 at master computer systems 106–108 (step 208).

Master computer systems 106–108 can then send synchronization signals to slave computer systems (step 210). In particular, master computer system 106 can send synchronization signals to slave computer systems 131–133. These synchronization signals enable slave computer systems 131–133 to synchronize their local clocks with local clock 116 in master computer system 106.

Similarly, master computer system 108 can send synchronization signals to slave computer systems 134–136. These synchronization signals enable slave computer systems 134–136 to synchronize their local clocks with local clock 118 in master computer system 108.

Next, the system uses local clocks 116–118 within master computer systems 106–108, respectively, to synchronize interactions between master computer systems 106–108 (step 212). For example, master computer systems 106–108 can synchronize various cache coherence operations as is described below with reference to FIG. 3.

Process of Synchronizing a Cache Entry

Figure 3:
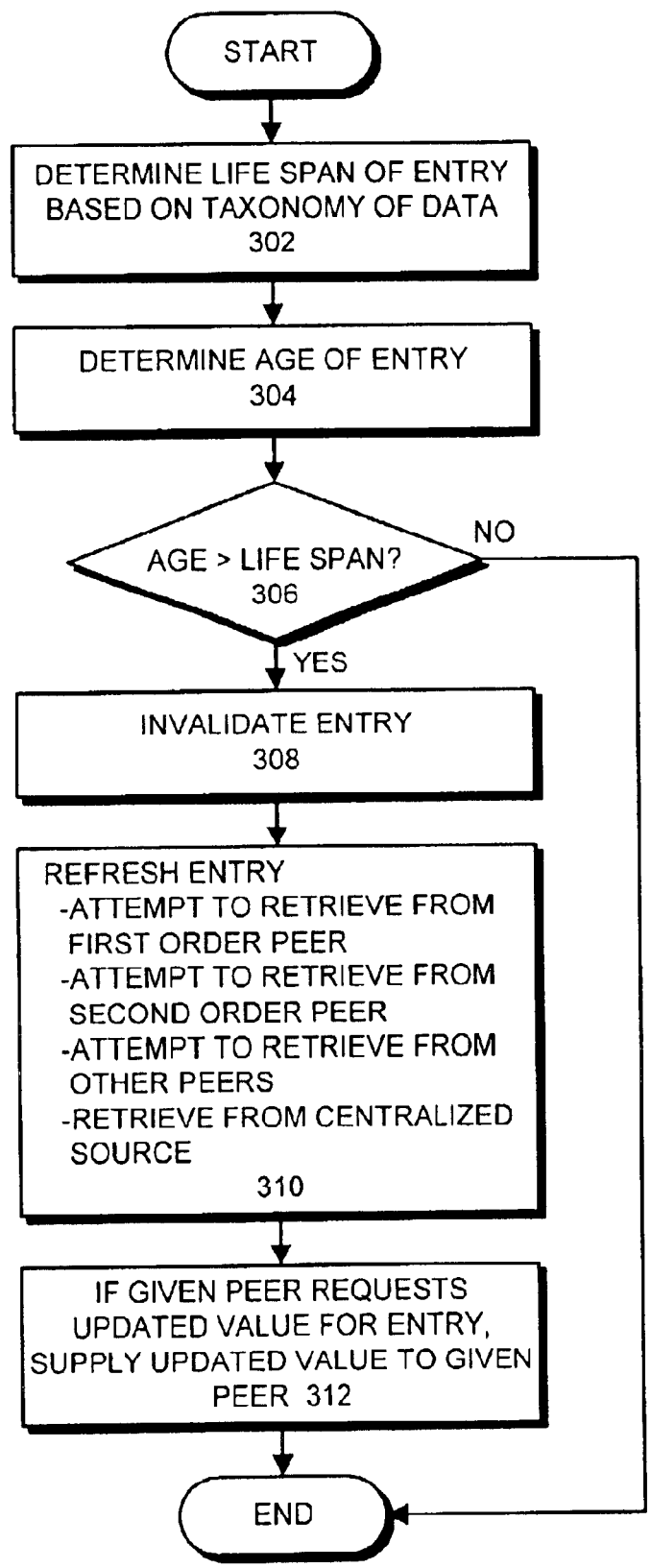
FIG. 3 is a flow chart illustrating the process of synchronizing a cache entry in accordance with an embodiment of the present invention.

FIG. 3 is a flow chart illustrating the process of synchronizing an entry in a cache in accordance with an embodiment of the present invention. The system starts by determining a life span of the entry based on a taxonomy of data that associates different life spans with different types of data (step 302). For example, the taxonomy may specify that entries containing time-critical data related to stock pricing may have a life span measured in seconds, while other less time-critical data has a life span measured in days. At the other extreme, some especially time-critical data, for example related to tracking missiles, may have a life span measured in milliseconds or microseconds.

Next, the system determines the age of an entry in the cache with reference to a time value extracted from a Global Positioning System (GPS) (step 304). (The process of extracting the time value from the GPS signal is described above with reference to FIG. 2.)

The system then determines if the age of the entry is greater than the life span of the entry (step 306). If not, the system is done.

Otherwise, if the age of the entry is greater than the life span of the entry, the system invalidates the entry in the cache (step 308). The system subsequently refreshes the entry by retrieving an updated value for the entry (step 310). This refresh operation can take place when the entry is subsequently accessed by the computer system. Alternatively, the refresh operation can take place automatically before a subsequent access to the entry takes place.

Refreshing the entry can involve attempting to retrieve the updated value from a first order peer that belongs to the same peer group as the computer system. If this is not successful, the system can attempt to retrieve the updated value from a second order peer, which can be accessed through a first order peer. If this is not successful, the system can attempt to retrieve the updated value from any other type of peer. If this is not successful, the system can retrieve the updated value from a centralized source for the updated value.

Next, if a given peer of the computer system subsequently requests the updated value for the entry, the system supplies the updated value to the given peer (step 312). In this way, the computer system can act as a peer in supplying the updated value to other computer systems that request it.

Note that communications between computer systems within distributed computing system 100 can be accomplished by using a peer-to-peer communication framework, such as the JTXA framework, developed by SUN Microsystems, Inc. of Santa Clara, Calif.

Also note that the process of synchronizing a single entry in a cache that is illustrated in FIG. 3 can be used to synchronize all of the entries in a cache.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for synchronizing an entry in a cache in a computer system through a peer-to-peer refreshing operation, comprising:
   determining the age of the entry in the cache within the computer system;
   determining the life span for the entry based upon a taxonomy of data that associates different life spans with different types of data: and
   if the age of the entry exceeds a life span for the entry, invalidating the entry in the cache, and
   refreshing the entry by retrieving an updated version of the entry from a peer of the computer system, if possible, instead of from a centralized source for the entry.

2. The method of claim 1, wherein determining the age of the entry involves determining the age of the entry with reference to a time value extracted from a Global Positioning System (GPS) signal.

3. The method of claim 1, wherein refreshing the entry involves waiting until the entry is accessed again before retrieving the updated version of the entry.

4. The method of claim 1, wherein refreshing the entry involves automatically refreshing the entry without waiting until the entry is accessed again.

5. The method of claim 1, wherein refreshing the entry involves:
   attempting to retrieve the updated version of the entry from a first-order peer, which is part of the same peer group as the computer system; and
   if the updated version of the entry cannot be retrieved from a first-order peer, attempting to retrieve the updated version of the entry from a second-order peer, which is accessible through a first order peer.

6. The method of claim 1, wherein if the updated version of the entry cannot be retrieved from a peer of the computer system, the method further comprises retrieving the updated version of entry from the centralized source for the entry.

7. The method of claim 1, wherein if a given peer of the computer system subsequently requests the updated version of the entry, the method further comprises supplying the updated version of the entry to the given peer.

8. The method of claim 1, wherein retrieving the updated version of the entry involves using a Juxtapose (JXTA) framework to facilitate peer-to-peer communications to retrieve the entry.

9. A computer-readable storage medium storing instructions that when executed by a computer system cause the computer system to perform a method for synchronizing an entry in a cache in the computer system through a peer-to-peer refreshing operation, the method comprising:
   determining the age of the entry in the cache within the computer system;
   determining the life span for the entry based upon a taxonomy of data that associates different life spans with different types of data; and
   if the age of the entry exceeds a life span for the entry, invalidating the entry in the cache, and
   refreshing the entry by retrieving an updated version of the entry from a peer of the computer system, if possible, instead of from a centralized source for the entry.

10. The computer-readable storage medium of claim 9, wherein determining the age of the entry involves determining the age of the entry with reference to a time value extracted from a Global Positioning System (GPS) signal.

11. The computer-readable storage medium of claim 9, wherein refreshing the entry involves waiting until the entry is accessed again before retrieving the updated version of the entry.

12. The computer-readable storage medium of claim 9, wherein refreshing the entry involves automatically refreshing the entry without waiting until the entry is accessed again.

13. The computer-readable storage medium of claim 9, wherein refreshing the entry involves:
   attempting to retrieve the updated version of the entry from a first-order peer, which is part of the same peer group as the computer system; and
   if the updated version of the entry cannot be retrieved from a first-order peer, attempting to retrieve the updated version of the entry from a second-order peer, which is accessible through a first order peer.

14. The computer-readable storage medium of claim 9, wherein if the updated version of the entry cannot be retrieved from a peer of the computer system, the method further comprises retrieving the updated version of entry from the centralized source for the entry.

15. The computer-readable storage medium of claim 9, wherein if a given peer of the computer system subsequently requests the updated version of the entry, the method further comprises supplying the updated version of the entry to the given peer.

16. The computer-readable storage medium of claim 9, wherein retrieving the updated version of the entry involves using a Juxtapose (JXTA) framework to facilitate peer-to-peer communications to retrieve the entry.

17. An apparatus that synchronizes an entry in a cache in a computer system through a peer-to-peer refreshing operation, comprising:
   an age determining mechanism that is configured to determine the age of the entry in the cache within the computer system;
   a life span determining mechanism that is configured to determine the life span for the entry based upon a taxonomy of data that associates different life spans with different types of data; and a refreshing mechanism, wherein if the age of the entry exceeds a life span for the entry, the refreshing mechanism is configured to, invalidate the entry in the cache, and to refresh the entry by retrieving an updated version of the entry from a peer of the computer system, if possible, instead of from a centralized source for the entry.

18. The apparatus of claim 17, wherein the age determining mechanism is configured to determine the age of the entry with reference to a time value extracted from a Global Positioning System (OPS) signal.

19. The apparatus of claim 17, wherein the refreshing mechanism is configured to wait until the entry is accessed again before retrieving the updated version of the entry.

20. The apparatus of claim 17, wherein the refreshing mechanism is configured to automatically refreshing the entry without waiting until the entry is accessed again.

21. The apparatus of claim 17, wherein the refreshing mechanism is configured to:

attempt to retrieve the updated version of the entry from a first-order peer, which is part of the same peer group as the computer system; and to attempt to retrieve the updated version of the entry from a second-order peer, which is accessible through a first order peer, if the updated version of the entry cannot be retrieved from a first-order peer.

22. The apparatus of claim 17, wherein if the updated version of the entry cannot be retrieved from a peer of the computer system, the refreshing mechanism is configured to retrieve the updated version of entry from the centralized source for the entry.

23. The apparatus of claim 17, wherein if a given peer of the computer system subsequently requests the updated version of the entry, the refreshing mechanism is configured to supply the updated version of the entry to the given peer.

24. The apparatus of claim 17, wherein the refreshing mechanism is configured to use a Juxtapose (JXTA) framework to facilitate peer-to-peer communications to retrieve the entry.

* * * * *

UNITED STATES PATENT AND TRADEMARK OFFICE
CERTIFICATE OF CORRECTION

PATENT NO. : 6,836,825 B2
DATED : December 28, 2004
INVENTOR(S) : Goff

It is certified that error appears in the above-identified patent and that said Letters Patent is hereby corrected as shown below:

Column 7,
Line 13, please delete the acronym "(OPS)" and replace with the acronym -- (GPS) --.

Signed and Sealed this

Tenth Day of May, 2005

JON W. DUDAS
*Director of the United States Patent and Trademark Office*